United States Patent
Leung et al.

(10) Patent No.: US 11,575,203 B1
(45) Date of Patent: Feb. 7, 2023

(54) 3-D PRINTED WIDEBAND HIGH-GAIN CIRCULARLY-POLARIZED DIELECTRIC RESONATOR ANTENNA

(71) Applicant: City University of Hong Kong, Hong Kong (HK)

(72) Inventors: Kwok Wa Leung, Hong Kong (HK); Zhen-Xing Xia, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 18 days.

(21) Appl. No.: 17/492,688

(22) Filed: Oct. 4, 2021

(51) Int. Cl.
*H01Q 9/04* (2006.01)
*H01Q 5/357* (2015.01)
*B33Y 10/00* (2015.01)
*H01Q 1/52* (2006.01)

(52) U.S. Cl.
CPC .............. *H01Q 5/357* (2015.01); *B33Y 10/00* (2014.12); *H01Q 1/523* (2013.01); *H01Q 9/0485* (2013.01); *H01Q 9/0492* (2013.01)

(58) Field of Classification Search
CPC .... H01Q 9/0485; H01Q 9/0492; H01Q 13/10; H01Q 9/045; H01Q 1/38; H01Q 1/2283; H01Q 13/106; H01Q 5/10; H01Q 9/0457; H01Q 9/16; H01Q 5/357; H01Q 1/523; B33Y 10/00
See application file for complete search history.

(56) References Cited

U.S. PATENT DOCUMENTS

| | | | | |
|---|---|---|---|---|
| 7,541,998 B1 * | 6/2009 | Chang | ................ | H01Q 9/0492 343/767 |
| 9,123,995 B2 * | 9/2015 | Leung | ..................... | H01Q 1/36 |
| 10,833,417 B2 * | 11/2020 | Leung | ................ | H01P 1/20309 |
| 10,856,408 B1 * | 12/2020 | Leung | .................. | H01P 1/2002 |
| 11,411,326 B2 * | 8/2022 | Leung | ................. | H01Q 9/0485 |
| 2008/0231541 A1 | 9/2008 | Teshirogi et al. | | |

(Continued)

FOREIGN PATENT DOCUMENTS

KR   101674137 B1 * 11/2016 ............. H01Q 13/08

OTHER PUBLICATIONS

K. Sakaguchi, T. Hamaki, and N. Hasebe, "A circularly polarized omnidirectional antenna," IEICE Trans. Commun., vol. E79-B, No. 11, pp. 1704-1710, 1996.

(Continued)

*Primary Examiner* — Vibol Tan
(74) *Attorney, Agent, or Firm* — Idea Intellectual Limited; Margaret A. Burke; Sam T. Yip

(57) ABSTRACT

The present invention provides a single-fed wideband circularly-polarized dielectric resonant antenna. The antenna includes a lower antenna portion configured as a twisted inverted-frustum having a twist angle $\theta$ between its top and bottom surfaces, wherein the twist angle $\theta$ is greater than zero degrees and less than 5 degrees. An upper antenna portion extends from the lower antenna portion top surface. The upper portion includes plural interleaved slabs of first and second dielectric materials having respective first and second dielectric constants, the interleaved slabs having a stepwise-varying height between adjacent slabs. The antenna may be mounted on a printed circuit substrate at a 45 degree angle to an excitation slot. The antenna may be compact and easily manufactured using 3-D printing techniques.

12 Claims, 20 Drawing Sheets

(56) References Cited

U.S. PATENT DOCUMENTS

| | | | |
|---|---|---|---|
| 2019/0131710 A1 | 5/2019 | Pan et al. |
| 2020/0044691 A1 | 2/2020 | Henry et al. |
| 2020/0076082 A1 | 3/2020 | Nasimuddin et al. |
| 2020/0203835 A1 | 6/2020 | Wu et al. |
| 2020/0287277 A1 | 9/2020 | Wang et al. |
| 2021/0021021 A1 | 1/2021 | Guthrie et al. |
| 2021/0104816 A1 | 4/2021 | Greve |
| 2021/0159608 A1 | 5/2021 | Verd et al. |

OTHER PUBLICATIONS

S. A. Long, M. W McAllister, and L. C Shen, "The resonant cylindrical dielectric cavity antenna," IEEE Trans. Antennas Propag., vol. 31, pp. 406-412, May 1983.
R. K. Mongia and P. Bhartia, "Dielectric resonator antennas—a review and general design relations for resonant frequency and bandwidth," J. Microw. Millimeter-Wave Eng., vol. 4, pp. 230-247, 1994.
K. M. Luk and K. W. Leung, Eds., Dielectric Resonator Antenna. U. K.: Research Studies Press, 2003.
A. Petosa, Dielectric Resonator Antenna Handbook. Norwood: Artech House Publishers, 2007.
C. Y. Huang, J. Y. Wu, and K. L. Wong, "Cross-slot-coupled microstrip antenna and dielectric resonator antenna for circular polarization," IEEE Trans. Antennas Propag , vol. 47, No. 4, pp. 605-609, Apr. 1999.
L. C. Y. Chu, D. Guha and Y. M. M. Antar, "Comb-shaped circularly polarised dielectric resonator antenna," Electron. Lett., vol. 42, No. 14, pp. 785-787, Jul. 6, 2006.
S. K. Khamas, "Circularly polarized dielectric resonator antenna excited by a conformal wire," IEEE Antennas Wireless Propag. Lett., vol. 7, pp. 240-242, 2008.
K. W. Khoo, Y. X. Guo, and L. C. Ong, "Wideband circularly polarized dielectric resonator antenna," IEEE Trans. Antennas Propag., vol. 55, No. 7, pp. 1953-1932, Jul. 2007.
X. S. Fang and K. W. Leung, "Linear-Zcircular-polarization designs of dual-/wide-band cylindrical dielectric resonator antennas," IEEE Trans Antennas Propag., vol. 60, No. 6, pp. 2662-2671, Jun. 2012.
S. K. Podilchak, J. C. Johnstone, M. Caillet, M. Clenet, and Y. M. M. Antar, "A compact wideband dielectric resonator antenna with a meandered slot ring and cavity backing," IEEE Antennas Wireless Propag. Lett., vol. 15, pp. 909-913, Sep. 2016.
R. Chair, S. L. S. Yang, A. A. Kishk, K. F. Lee, and K. M. Luk, "Aperture fed wideband circularly polarized rectangular stair shaped dielectric resonator antenna," IEEE Trans. Antennas Propag., vol. 54, No. 4, pp. 1350-1352, Apr. 2006.
S. Fakhte, H. Oraizi, R. Karimian and R. Fakhte, "A new wideband circularly polarized stair-shaped dielectric resonator antenna," IEEE Trans. Antennas Propag., vol. 63, No. 4, pp. 1828-1832, Apr. 2015.
Y. M. Pan and K. W. Leung, "Wideband circularly polarized trapezoidal dielectric resonator antenna," IEEE Antennas Wireless Propag. Lett., vol. 9, pp. 588-591, 2010.
J. M. Lee et al., "Circularly polarized semi-eccentric annular dielectric resonator antenna for X-band applications," IEEE Antennas Wireless Propag. Lett., vol. 14, pp. 1810-1813, 2015.
A. Altaf, Y. Yang, K. Lee and K. C. Hwang, "Circularly polarized spidron fractal dielectric resonator antenna," IEEE Antennas Wireless Propag. Lett., vol. 14, pp. 1806-1809, 2015.
Z. Zhao, J. Ren, Y. Liu, Z. Zhou and Y. Yin, "Wideband dual-feed, dual-sense circularly polarized dielectric resonator antenna," IEEE Trans. Antennas Propag., vol. 68, No. 12, pp. 7785-7793, Dec. 2020.
S. Fakhte, H. Oraizi, and R. Karimian, "A novel low-cost circularly polarized rotated stacked dielectric resonator antenna," IEEE Antennas Wireless Propag Lett, vol. 13, pp. 722-725, 2014.
K. X. Wang and H. Wong, "A circularly polarized antenna by using rotated-stair dielectric resonator," IEEE Antennas Wireless Propag. Lett., vol. 14, pp. 787-790, 2015.

G. Varshney, V. S. Pandey, R. S. Yaduvanshi and L. Kumar, "Wide band circularly polarized dielectric resonator antenna with stair-shaped slot excitation," IEEE Trans Antennas Propag., vol. 65, No. 3, pp. 1380-1383, Mar. 2017.
W. Yang, W. Sun, H. Tang and J. Chen, "Design of a circularly polarized dielectric resonator antenna with wide bandwidth and low axial ratio values," IEEE Trans. Antennas Propag., vol. 67, No. 3, pp. 1963-1968, Mar. 2019.
W. Sun, W. Yang, P. Chu and J. Chen, "Design of a wideband circularly polarized stacked dielectric resonator antenna," IEEE Trans. Antennas Propag., vol. 67, No. 1, pp. 591-595, Jan. 2019.
F. Calignano et al., "Overview on additive manufacturing technologies," Proc. IEEE, vol. 105, No. 4, pp. 593-612, Apr. 2017.
H. Xin and M. Liang, "3-D-printed microwave and THz devices using polymer jetting techniques," Proc. IEEE, vol. 105, No. 4, pp. 737-755, Apr. 2017.
A. I. Dimitriadis et al., "Polymer-based additive manufacturing of high-performance waveguide and antenna components," Proc. IEEE, vol. 105, No. 4, pp. 668-676, Apr. 2017.
B. Zhang, Y. Guo, H. Zirath, and Y. P. Zhang, "Investigation on 3-D printing technologies for millimeter-wave and terahertz applications," Proc. IEEE, vol. 105, No. 4, pp. 723-736, Apr. 2017.
J.-P. Kruth, M. C. Leu, and T. Nakagawa, "Progress in additive manufacturing and rapid prototyping," CIRP Ann. Manuf. Technol., vol. 47, No. 2, pp. 525-540, 1998.
N. T. Nguyen, N. Delhote, M. Ettorre, D. Baillargeat, L. Coq, and R. Sauleau, "Design and characterization of 60-GHz integrated lens antennas fabricated through ceramic stereolithography," IEEE Trans. Antennas Propag., vol. 58, No. 8, pp. 2757-2762, Aug. 2010.
H. Yi, S. Qu, K. Ng, C. H. Chan and X. Bai, "3-D printed millimeter-wave and terahertz lenses with fixed and frequency scanned beam," IEEE Trans Antennas Propag., vol. 64, No. 2, pp. 442-449, Feb. 2016.
Y. Li, L. Ge, M. Chen, Z. Zhang, Z. Li, and J. Wang, "Multibeam 3-D-printed Luneburg lens fed by magneto-electric dipole antennas for millimeter-wave MIMO applications," IEEE Trans. Antennas Propag., vol. 67, No. 5, pp. 2923-2933, May 2019.
P. Nayeri et al., "3D printed dielectric reflectarrays: Low-cost high-gain antennas at sub-millimeterwaves," IEEE Trans. Antennas Propag., vol. 62, No. 4, pp. 2000-2008, Apr. 2014.
M. D. Wu et al., "Design and measurement of a 220 GHz wideband 3-D printed dielectric reflectarray," IEEE Antennas Wireless Propag. Lett., vol. 17, No. 11, pp. 2094-2098, Nov. 2018.
B. Zhang et al., "Metallic 3D printed antennas for millimeter- and submillimeter-wave applications," IEEE Trans. THz Sci. Technol., vol. 6, No. 4, pp. 592-600, Jul. 2016.
G. Addamo et al., "3-D printing of high-performance feed horns from Ku- to V-bands," IEEE Antennas Wireless Propag Lett., vol. 17, No. 11, pp. 2036-2040, Nov. 2018.
Z. Wu, W.-R. Ng, M. E. Gehm, and H. Xin, "Terahertz electromagnetic crystal waveguide fabricated by polymer jetting rapid prototyping," Opt. Exp., vol. 19, No. 5, pp. 3962-3972, Jan. 2011.
M. D'Auria et al., "3-D printed metal-pipe rectangular waveguides," IEEE Trans. Compon. Packag. Manuf. Technol., vol. 5, No. 9, pp. 1339-1349, Sep. 2015.
Z. Wu, J. Kinast, M. E. Gehm, and H. Xin, "Rapid and inexpensive fabrication of terahertz electromagnetic bandgap structures," Opt. Exp., vol. 16, No. 21, pp. 16442-16451, Oct. 2008.
J. Huang, S. J. Chen, Z. Xue, W. Withayachumnankul, and C. Furneaux, "Impact of infill pattern on 3D printed dielectric resonator antennas," in Proc. IEEE Asia-PacificConf. Antennas Propag., Auckland, New Zealand, 2018, pp. 233-235.
Z. Xia, K. W. Leung and K. Lu, "3-D-printed wideband multi-ring dielectric resonator antenna," IEEE Antennas Wireless Propag. Lett., vol. 18, No. 10, pp. 2110-2114, Oct. 2019.
ANSYS HFSS Version 16.0, Ansys Inc. Accessed: Jul. 18, 2017. [Online]. Available: http://www.ansys.com.

* cited by examiner

3-D PRINTED WIDEBAND HIGH-GAIN CIRCULARLY-POLARIZED DIELECTRIC RESONATOR ANTENNA

FIELD OF THE INVENTION

The present invention generally relates to circularly-polarized antennas and, more particularly, circularly-polarized dielectric resonator antennas susceptible to fabrication by 3D printing.

BACKGROUND OF THE INVENTION

Circularly polarized (CP) antennas have been extensively employed in wireless communication systems. CP antennas permit flexible orientation between a receiver and a transmitter, and alleviates the multipath problem, which is normally caused by the reflections from the ground surface and building walls. Dielectric resonator (DR) antenna (DRA) is a promising antenna for its advantages of compact size, ease of excitation, different radiation patterns, and the absence of conduction losses in the radiator. Therefore, it is of interest to develop CP DRAs.

Thus far, a number of CP DRAs have been reported. These antennas can be categorized as single-fed or multi-fed CP DRAs. The former are simple designs but suffer from narrower 3 dB axial ratio (AR) bandwidths of only 6% or less, whereas the latter are wider designs with 3 dB AR bandwidths of 20% or more. However, these wideband CP DRAs require complex feed networks to provide feed signals with the same amplitude and quadrature phase difference, thus inevitably increasing the insertion loss and the overall antenna size.

To broaden the AR bandwidths of single-fed CP DRAs, irregular geometrics, including stair-shaped, notched trapezoidal, semi-eccentric annular, fractal-shaped, and bowtie-shaped, have been proposed. Also, rotated-stacked DRAs have been demonstrated to be effective wideband CP designs. The AR bandwidths can be further enhanced by using multi-segment DRAs. For instance, one proposed design combines two half-split cylindrical DRs and a rectangular DR. This design can provide a wide AR bandwidth of 41%, but has a low broadside antenna gain varying between only 1.5 and 2.1 dBi. Recently, a single-fed multi-layered CP DRA with an AR bandwidth of 22.8% has been reported. It includes three dielectric layers, in which a rectangular DR with a low dielectric constant is sandwiched between two ceramic films with high dielectric constants. It is challenging to assemble such a multi-layered DRA, because it is difficult to avoid an air gap between adjacent dielectric layers. The CP DRAs described above are manufactured using conventional mechanical assembly approaches which are time-consuming and high-cost.

As compared to conventional manufacturing methods, 3-D printing is more flexible, has a shorter lead time, is more eco-friendly, and is lower cost. Since 3-D printing technology was proposed in the late 1980s, several key 3-D printing techniques, such as fused deposition modeling (FDM), stereolithography apparatus, polymer jetting, and selective laser melting, have been developed. Various 3-D-printed passive components, operating at frequencies from GHz to THz, have been reported. These designs include lens antennas, reflectarrays, horn antennas, waveguides, and electromagnetic band gap structures. However, only limited efforts have been made on 3-D-printed DRAs.

Therefore, there is a need in the art for a single-fed circularly polarized dielectric resonator antennas with improved properties and improved fabrication techniques. Such antennas may be used in wireless communication system.

SUMMARY OF THE INVENTION

A 3-D-printed single-fed CP DRA with a very wide 3-dB AR bandwidth of 68.6% is produced and tested. The DRA comprises a twisted inverted-frustum DR and two types of dielectric slabs with different dielectric constants. The twisted DR is embedded with three dielectric strips of low dielectric constants. It can support multiple broadside radiating modes with close resonant frequencies. The dielectric slabs are designed with a step-height distribution to adjust the magnitude ratio and phase difference of the excited degenerate modes. To generate circular polarization, the DRA is rotated by 45° with respect to the excitation slot. A prototype that operates at C-band was designed and fabricated using FDM multi-material 3-D printing technique. The reflection coefficient, AR, radiation pattern, antenna gain, and efficiency of the antenna are measured. Reasonable agreement between the measured and simulated results is obtained.

In one aspect, the present invention provides a single-fed wideband circularly-polarized dielectric resonant antenna. The antenna includes a lower antenna portion configured as a twisted inverted-frustum having a twist angle θ between its top and bottom surfaces, wherein the twist angle θ is greater than zero degrees and less than 5 degrees. An upper antenna portion extends from the lower antenna portion top surface. The upper portion includes plural interleaved slabs of first and second dielectric materials having respective first and second dielectric constants, the interleaved slabs having a stepwise-varying height between adjacent slabs.

DETAILED DESCRIPTION

Figure 1A:
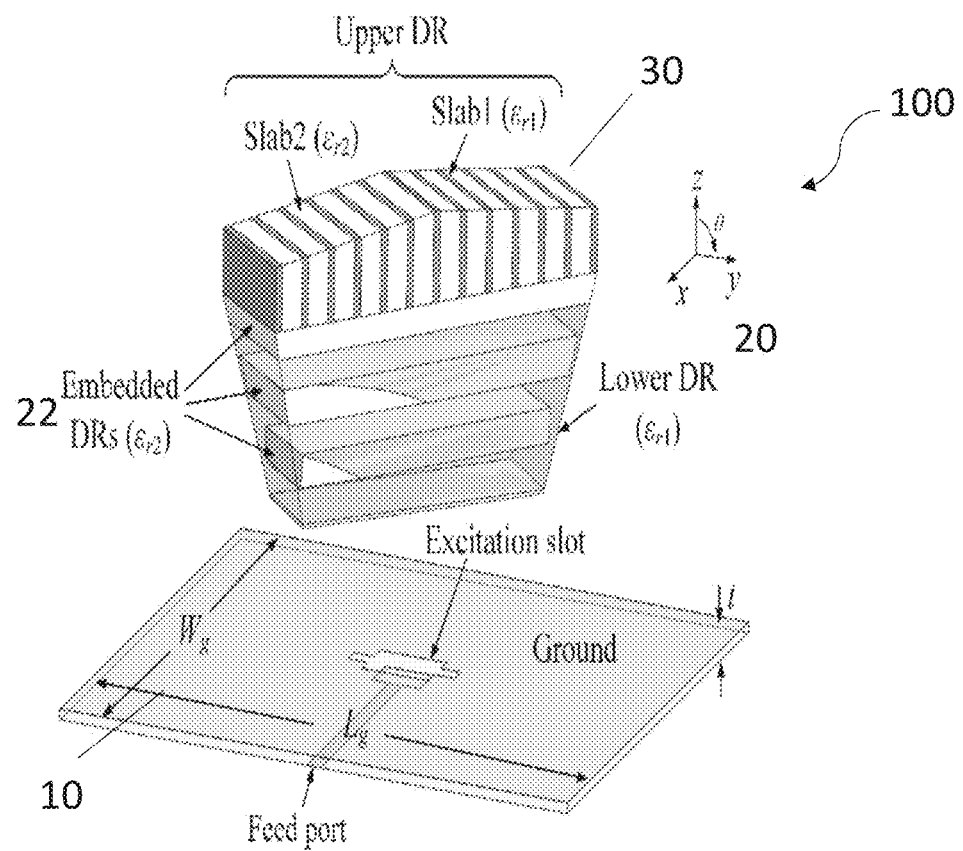
FIGS. 1A-1D are several views of an antenna according to an embodiment.

Antenna:

Turning to the drawings in detail, FIG. 1A shows the configuration of a wideband circularly-polarized (CP) dielectric resonator antenna (DRA) 100 according to an embodiment of the present invention. The DRA 100 is mounted on a rectangular printed circuit board (PCB) 10 with a width of $W_g$, length of $L_g$, and thickness of t. The PCB has a dielectric constant of 3.55 and loss tangent of 0.0027. As seen in FIG. 1A, the DRA contains lower 20 and upper 30 dielectric portions. The lower portion 20 is an inverted-frustum DR with a dielectric constant of $\varepsilon_{r1}$. In the example of FIG. 1A, the inverted frustum is that of a rectangular pyramid. A frustum, as the term is used herein, is a portion of a solid (here, a rectangular pyramid) that lies between two parallel planes that pass through the solid. Alternatively, the lower antenna may be an inverted trapezoidal prism, that is a three-dimensional shape that is made of two trapezoids (e.g., the trapezoid of FIG. 1C) joined by rectangles (e.g., base and sides). The lower portion 20 is embedded with three dielectric strips 22 with the same dielectric constant of $\varepsilon_{r2}$ and supports multiple TE modes with close resonant frequencies.

Figure 1B:
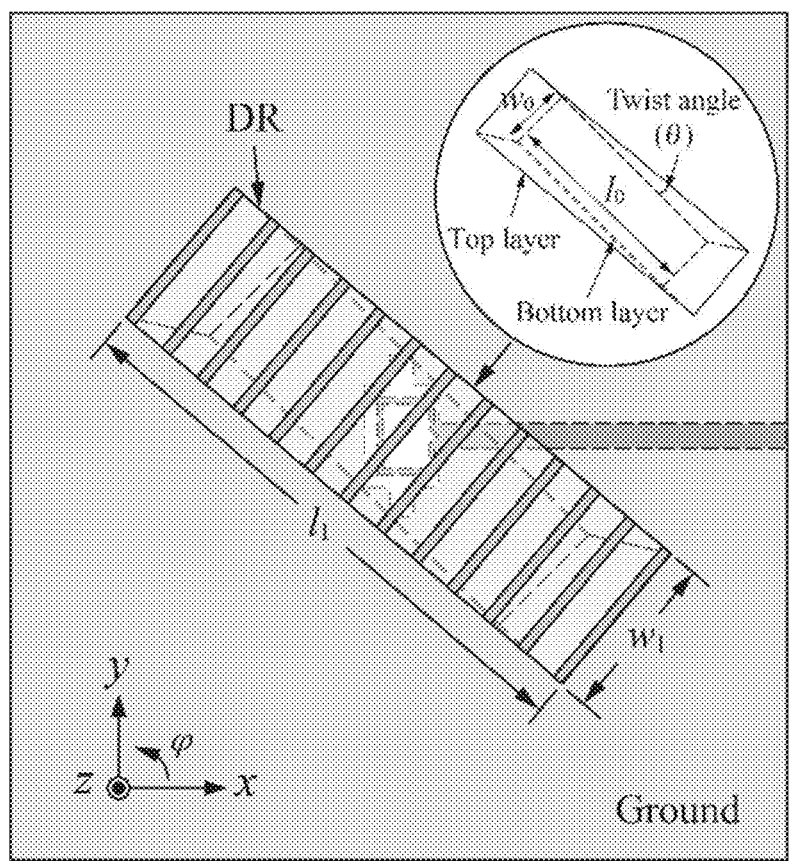
Figure 1C:
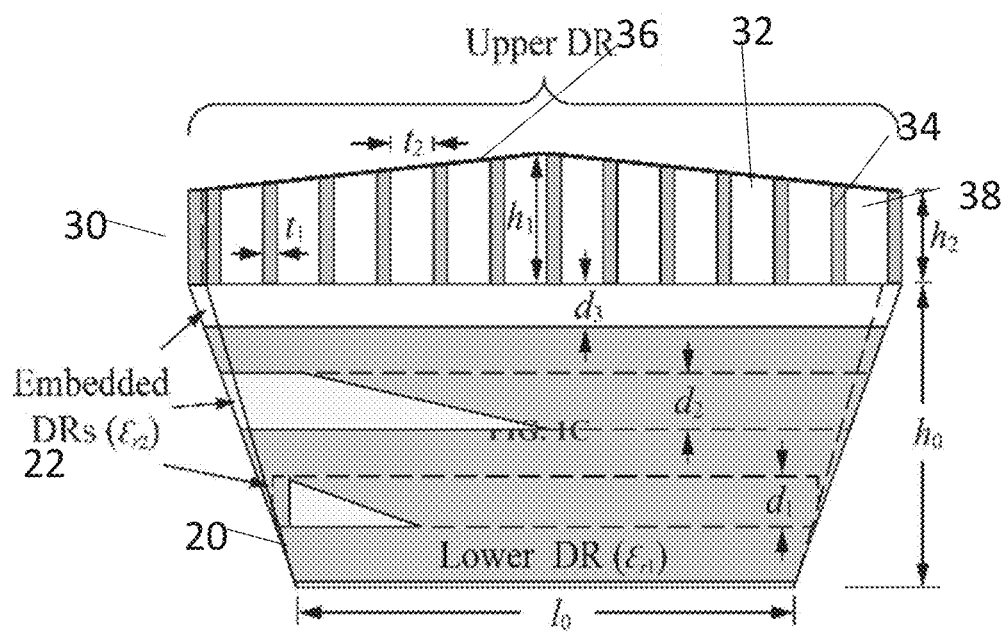

Turning to FIG. 1B, which depicts a top view of the antenna, the inverted-frustum DR has a twist angle of $\theta$ between its top and bottom surfaces. The twist angle is utilized to fine tune the antenna AR performance. A twist angle of greater than zero and less than or equal to approximately 10 degrees may be used with 5 being an exemplary embodiment. In the side view of FIG. 1C, upper portion 30 includes two kinds of step-height dielectric slabs 32, 34 with thicknesses of $t_1$ and $t_2$, respectively, on the top surface of the inverted-frustum lower portion DR 20. These dielectric slabs help to perturb the excited degenerate modes to obtain the same magnitude and 90° phase difference and thus, enhancing the antenna AR bandwidth. The middle dielectric slab 36 has the maximum height of $h^1$, whereas the edgemost dielectric slab 38 has the minimum height of $h_2$. Embedded DRs 22 have thickness $d_1$, $d_2$, and $d_3$.

Figure 1D:
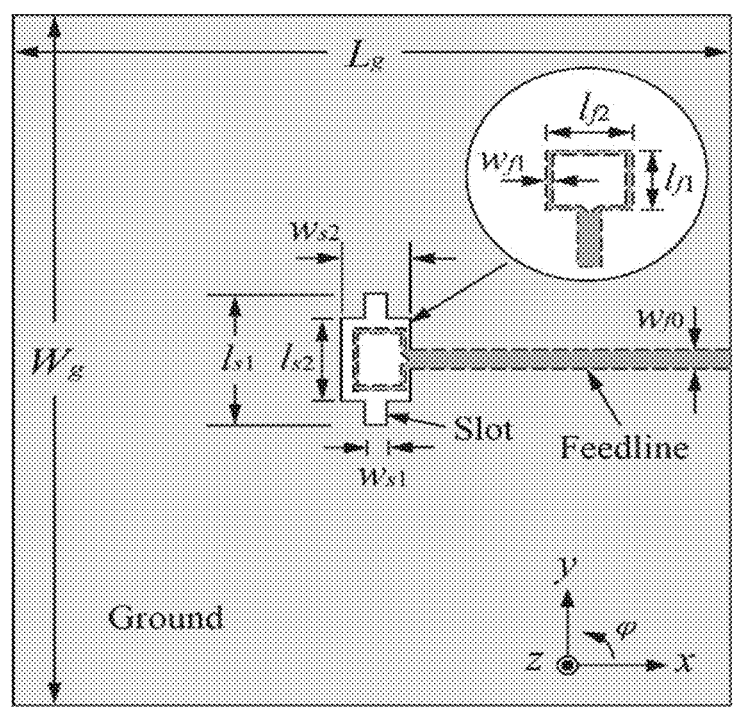

With reference to FIG. 1D, a stepped slot 16 etched in the ground plane 12 is used to excite the DRA. It is fed by a small electric rectangular ring 14 with dimensions of $l_{f1} \times l_{f2}$. To facilitate the excitation of orthogonal degenerate modes for generating circular polarization, the DRA is rotated by 45° with respect to the excitation slot, as shown in FIG. 1B. An exemplary set of values that may be used for the various dimensions and material properties are listed in Table I. It is understood that these are only exemplary values and that other dimensions may be used in the antennas of the present invention.

TABLE I

| ANTENNA PARAMETERS | | | |
|---|---|---|---|
| $\varepsilon_{r1}$ | $\varepsilon_{r2}$ | $L_g$ | $W_g$ |
| 10 | 3 | 60 mm | 55 mm |
| $t_1$ | $l_0$ | $l_1$ | $w_0$ |
| 0.813 mm | 29 mm | 40.4 mm | 9 mm |
| $w_1$ | $\theta$ | $t_1$ | $t_2$ |
| 12 mm | 5° | 0.8 mm | 2.5 mm |

TABLE I-continued

| ANTENNA PARAMETERS | | | |
|---|---|---|---|
| $h_0$ | $h_1$ | $h_2$ | $d_1$ |
| 16 mm | 7 mm | 5 mm | 2.7 mm |
| $d_2$ | $d_3$ | $w_{s1}$ | $w_{s2}$ |
| 3 mm | 2.3 mm | 1.8 mm | 5.5 mm |
| $l_{s1}$ | $l_{s2}$ | $l_{f1}$ | $l_{f2}$ |
| 12.5 mm | 8 mm | 4.2 mm | 5.8 mm |

Figure 2:
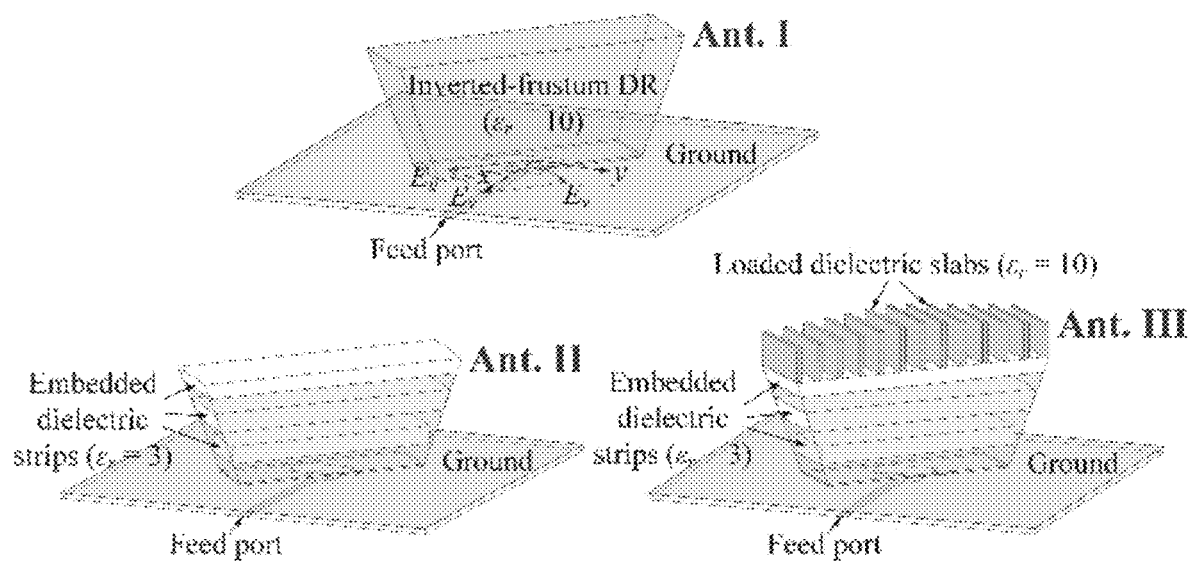
FIG. 2 depicts several reference DRAs.
Figure 3:
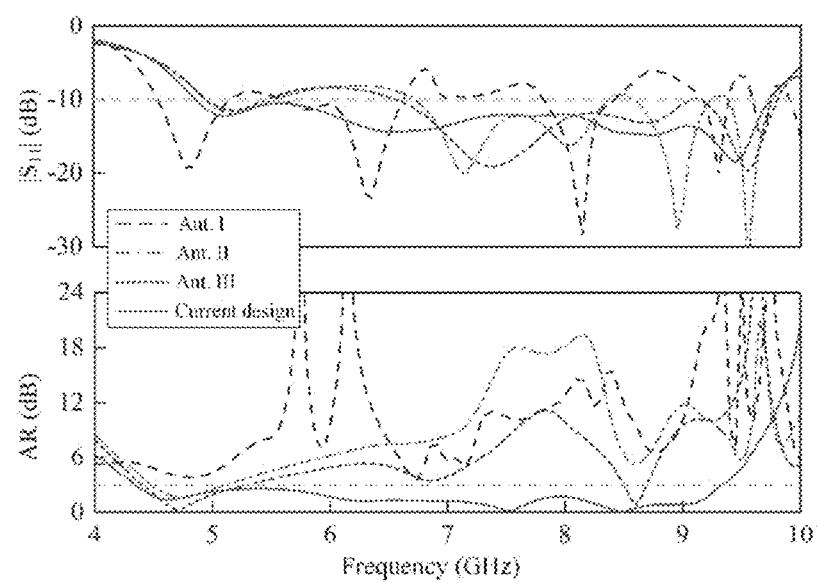
FIG. 3 depicts simulated reflection coefficients and ARs of reference antennas and an antenna of an embodiment.
Figure 4A:
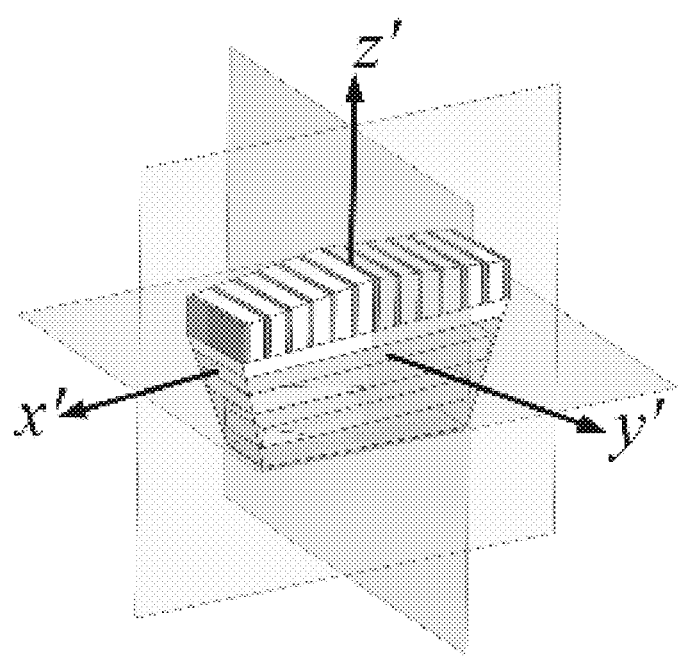
FIGS. 4A-4F depict simulated E-field distributions of the antenna at orthogonal phases for each CP mode.
Figure 4B:
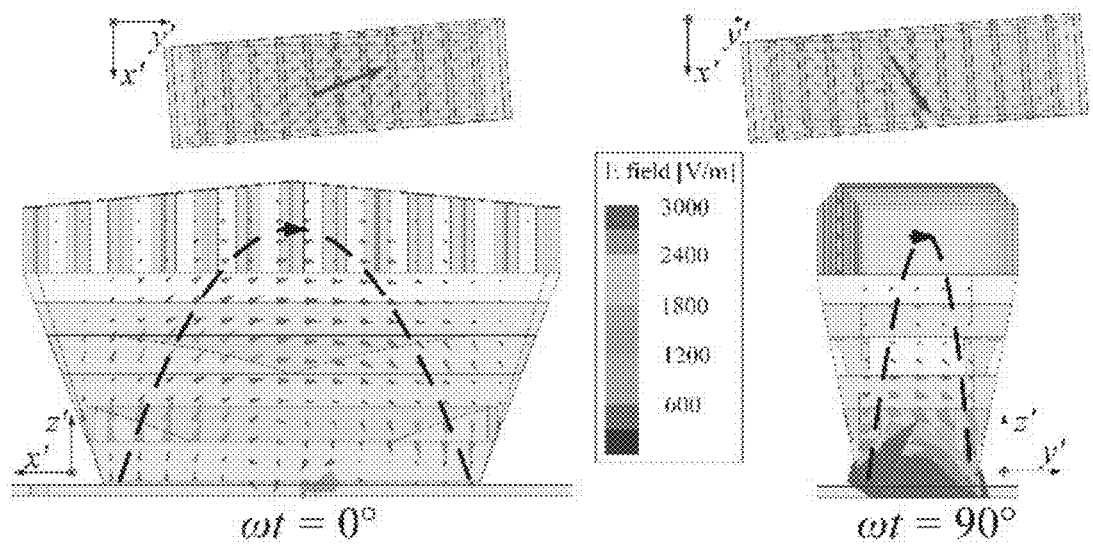
Figure 4C:
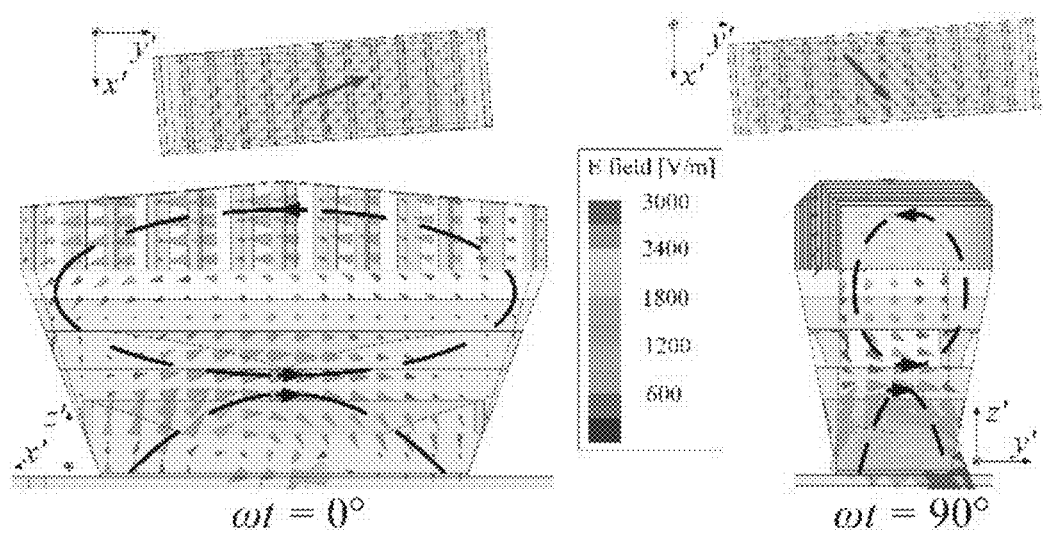
Figure 4D:
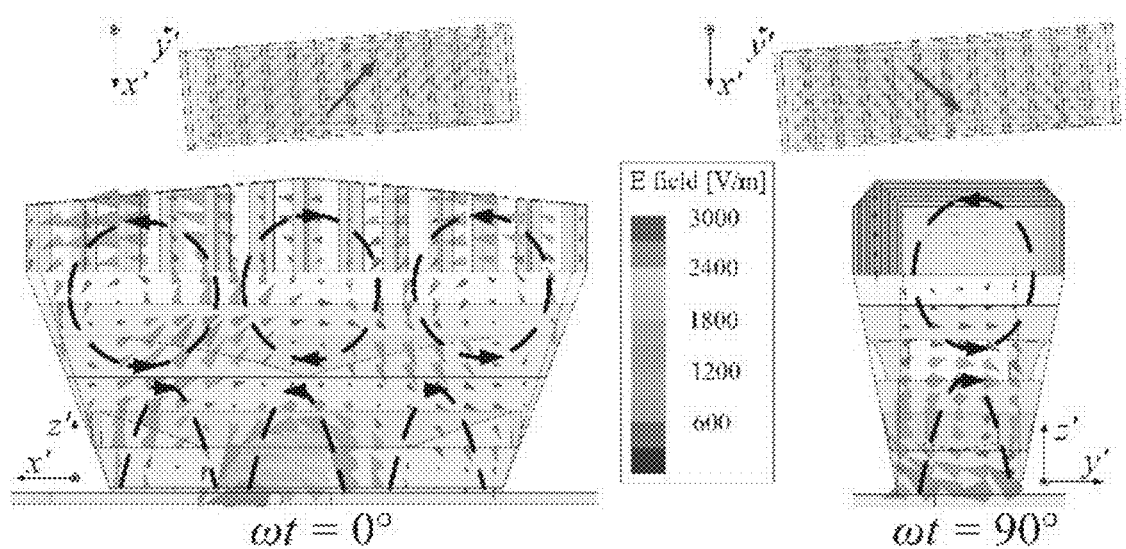
Figure 4E:
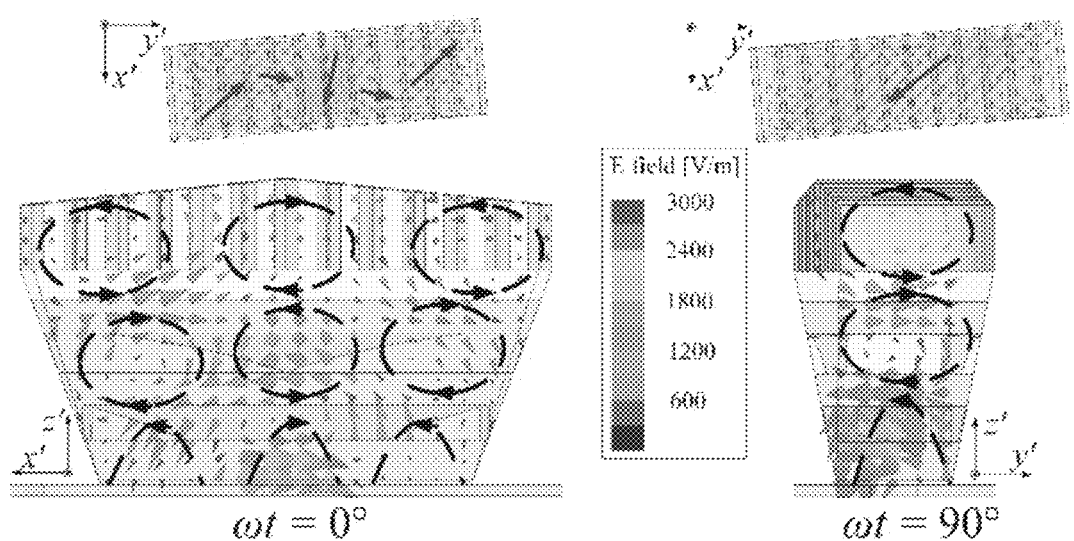
Figure 4F:
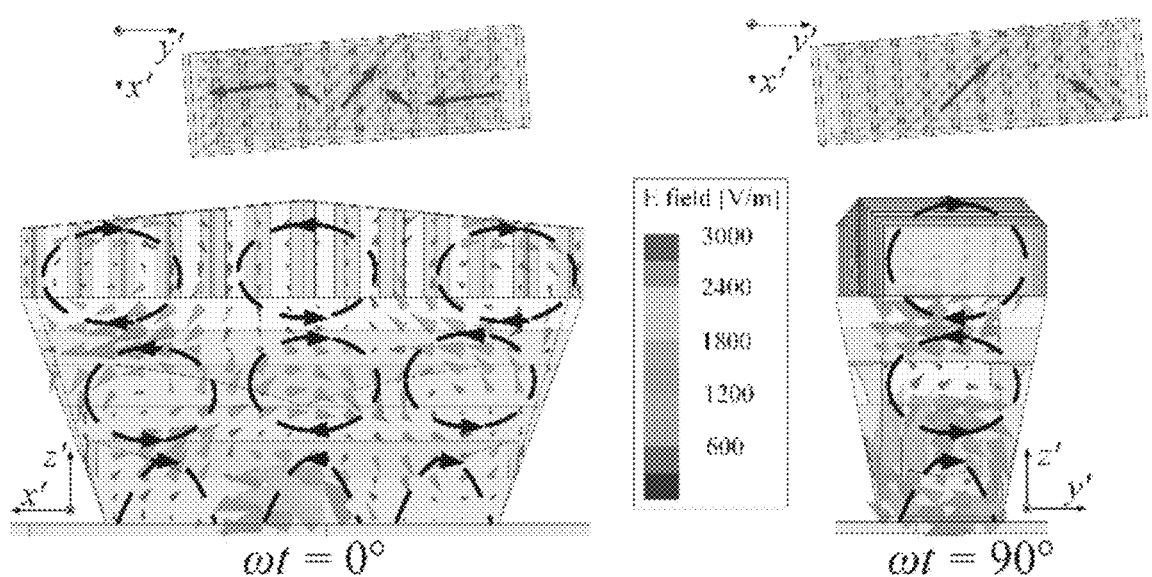

Working Mechanism:

To understand the operating principle of the CP DRA, three reference DRAs (Ant. I, Ant. II, and Ant. III) were simulated and compared with the configuration shown in FIGS. 1A-1D. With reference to FIG. 2, Ant. I is a conventional slot-coupled CP DRA, in which an inverted-frustum DR with a dielectric constant of 10 is rotated by 45° with respect to the excitation slot. Ant. II is obtained from Ant. I by embedding three dielectric strips. Ant. III is obtained by loading dielectric slabs with a step-height distribution on Ant. II. FIG. 3 shows the simulated reflection coefficients and ARs of the reference antennas of FIG. 2 and inventive antenna of FIGS. 1A-1D. With reference to FIG. 3, multiple resonant modes of Ant. I are excited. However, these resonant modes are far away from each other, leading to a narrow operating bandwidth. Also, Ant. I presents reasonable CP performance at several separate frequency bands. This can be explained as follows. As can be seen from FIG. 2, when the E-field $E_x$ generated from the excitation slot passes through the rotated DR, the DRA will be excited, while the $E_x$ will be dissolved into two orthogonal E-fields, namely, $E_u$ and $E_v$. Since the DR has a large aspect ratio, $E_u$ and $E_v$ mainly travel along the DR and air regions respectively, leading to different propagation constants. Additionally, the magnitude ratio of the $E_u$ and $E_v$ is determined by the rotated angle of DR. Hence, by properly controlling the aspect ratio and rotated angle of DR, the orthogonal E-field components of $E_u$ and $E_v$ with an equal magnitude and quadrature phase difference can be obtained, and then the CP radiation is produced.

With reference to FIG. 3, the resonant frequencies of Ant. I shift upwards after inserting three dielectric strips with low dielectric constants of 3. This is because, in this case, the DR in Ant. II has a lower effective dielectric constant. Also, the inserted dielectric strips resemble a linear-to-CP converter, which contributes to the improvement of CP performance at the lower frequency band. By loading dielectric slabs on the DR to obtain Ant. III from Ant. II, several adjacent resonant modes at the upper frequency band can be merged together, resulting in wide impedance bandwidth. In addition, Ant. III has better CP performance at the upper frequency band. Because the loaded dielectric slabs help to perturb the high-order degenerate modes to obtain the same magnitude and 90° phase difference. The antenna 100 of FIGS. 1A-1D may be obtained from Ant. III by further loading dielectric slabs ($\varepsilon_r$=3) with a step-height distribution. With reference to FIG. 3, multiple resonant modes of the current DRA are now merged, giving a wide 10-dB impedance bandwidth of 66.5% (4.87-9.73 GHz). Also, five AR minimums at 4.6, 6.3, 7.5, 8.5, and 9.1 GHz can be observed in the AR passband in FIG. 3, obtaining a wide 3-dB AR bandwidth of 73.1% (4.34-9.34 GHz).

To further illustrate the CP mechanism of our DRA, the simulated E-field distributions for each AR minimum are given in FIG. 4. FIG. 4A shows the reference coordinate system, in which the x'y'-plane is located at the half height of the DRA. With reference to FIGS. 4B and 4C, it can be inferred that the first AR minimum at 4.6 GHz is due to the orthogonal fundamental modes of $TE_{1\delta1}^{y'}$ and $TE_{\delta11}^{x'}$, whereas the second AR minimum at 6.3 GHz is caused by the orthogonal high-order modes of $TE_{1\delta3}^{y'}$ and $TE_{\delta13}^{x'}$. For the third AR minimum at 7.5 GHz, as can be seen from FIG. 4D, the E-field distribution depicted in the x'z'-plane verifies that the DRA is excited in the $TE_{3\delta3}^{y'}$ mode. It is noted that at the frequencies of the fourth and fifth AR minimums, the DRA operates at the same modified $TE_{3\delta5}^{y'}$ mode, which can be observed from the E-field distributions in the x'z'-planes in FIGS. 4F and 4E. It was found that these high-orderDR modes combine with the orthogonal slot modes generated by the excitation slot, producing the remaining three AR minimums in the upper band.

Parametric Study

Figure 5:
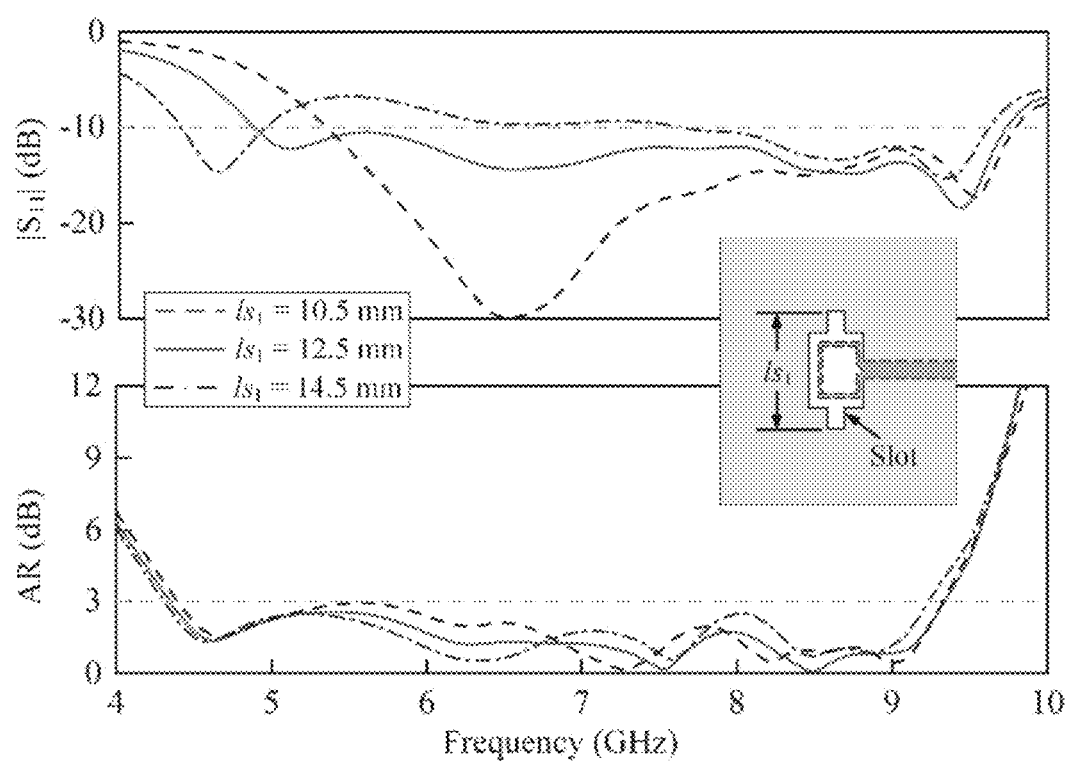
FIG. 5 depicts simulation reflection coefficient and AR of the antenna as a function of frequency for different slot lengths.

To characterize the CP DRA of the present invention, a parametric study was carried out using ANSYS HFSS. In the parametric study, only one parameter was varied at one time, with other parameters given from the example of Table I. To begin with, the effect of the excitation slot length $l_{s1}$ is studied. FIG. 5 shows the reflection coefficient and AR for different slot length of $l_{s1}$=10.5, 12.5, and 14.5 mm. With reference to the figure, $l_{s1}$ significantly affects the impedance matching of DRA, with a wide 10-dB impedance bandwidth of 66.5% (4.87-9.73 GHz) obtained at $l_{s1}$=12.5 mm. Also, as can be observed from FIG. 5, $l_{s1}$ has a stronger effect on the AR upper band than the AR lower band. It further verifies that the AR minimums in the upper band mainly come from the combination of the slot modes and orthogonal DR modes.

Figure 6:
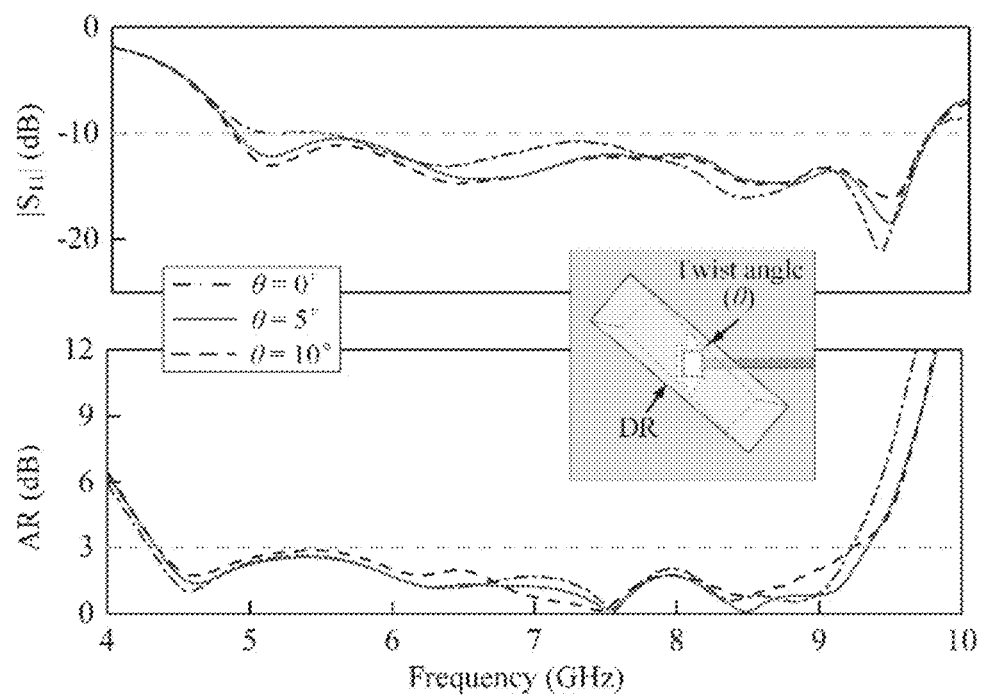
FIG. 6 depicts simulated reflection coefficient and AR of the antenna as a function of frequency for different DR twist angles of 0, 5, and 10 degrees.

Next, the effect of the DR twist angle θ is investigated. FIG. 6 shows the reflection coefficient and AR for different twist angle of θ=0°, 5°, and 10°. With reference to the figure, θ can be used to fine-tune the AR performance, with little effect on the impedance matching. This favorable result greatly facilitates the wide band CP DRA design. A wide 3-dB AR bandwidth of 73.1% (4.34-9.34 GHz) can be obtained at θ=5°.

EXAMPLE

Antenna Fabrication

Figure 7A:
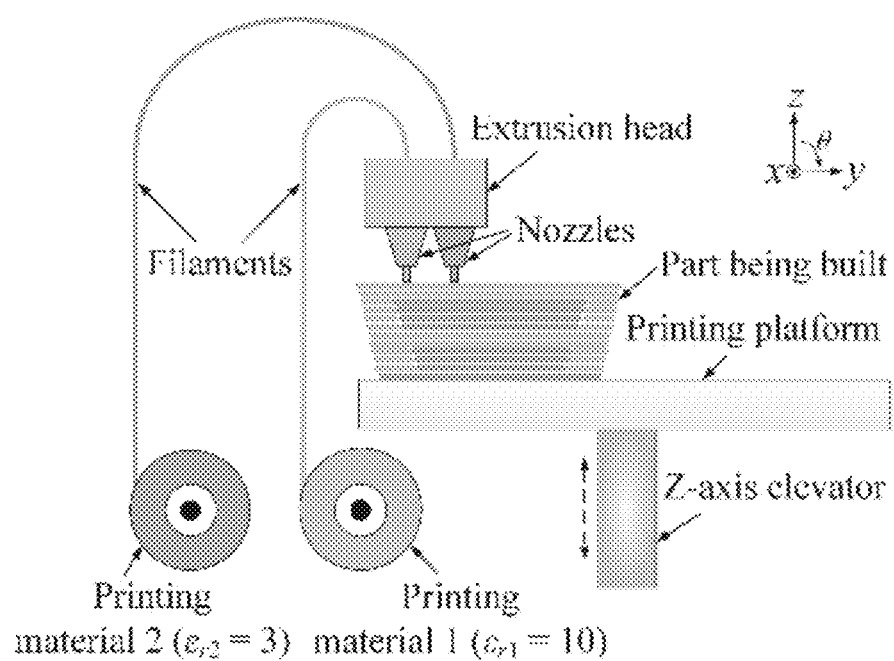
FIG. 7A schematically depicts an FDM multi-material 3-D printing technique used to fabricate the antenna.

The CP DRA 100 of the present invention operating at C-band was fabricated using 3-D printing. The antenna models were converted into a series of layered slices before the practical 3-D printing process. The slice thickness selected for printing was fixed at 0.3 mm. However, it is understood that other slice thicknesses may be used. FIG. 7A schematically depicts a fused deposition modeling (FDM) 3-D printing technique used to fabricate antenna 100. Initially, the filament of the printing material, which has a standard diameter of 1.75 mm, is melted inside the cavity of the heated extrusion head. Next, the molten printing material is pushed and forced through a nozzle to obtain a thin softened filament, and then deposited at designated locations on the printing platform. Once the extruded printing material arrives at the printing platform, it cools down and hardens rapidly. It is noted that each model layer is composed of these thin and hard filaments. The building platform, which is accurately controlled by the z-axis elevator, is lowered by 0.3 mm after each layer is completely printed, and then the next layer is automatically processed. Finally, the entire 3-D-printing processing ends when all layers are completely constructed.

Figure 7B:
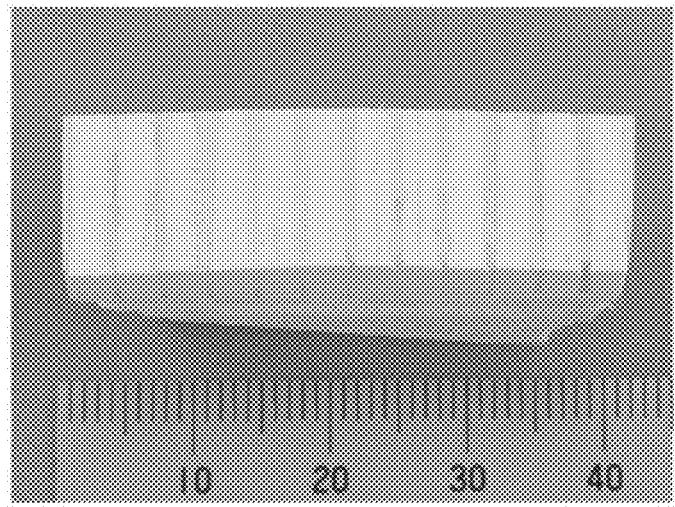
FIGS. 7B and 7C depict the fabricated antenna.
Figure 7C:
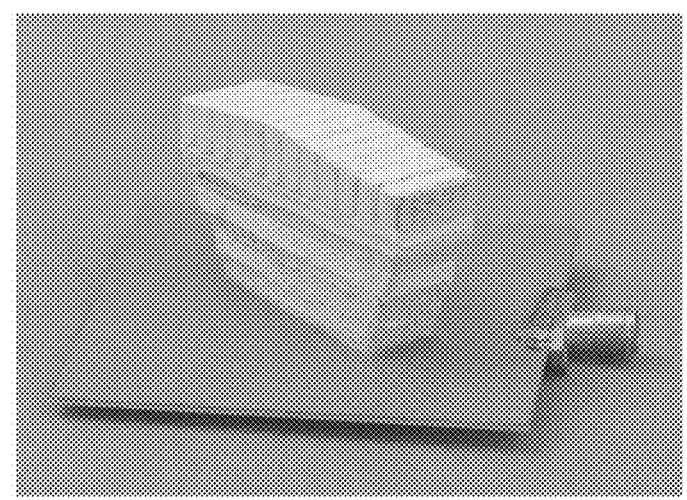

Since the CP DRA 100 of the present invention contains two different dielectric constant materials, an FDM 3-D printer with two independent nozzles is used for multi-material 3-D printing, as shown in FIG. 7A. Both printing materials have loss tangents of approximately 0.003 at 6 GHz. The selected 3-D printer has a printing resolution and tolerance of 0.05 mm and 0.1 mm, respectively, and takes about 100 minutes to print out the DRA with an overall material cost of less than $15 USD. FIGS. 7B and 7C show top and perspective photos of the fabricated antenna.

Antenna Characterization

The reflection coefficient of the antenna was measured using an Agilent vector network analyzer N5230A, whereas the AR, radiation pattern, antenna gain, and antenna efficiency were measured using a Satimo StartLab system.

Figure 8:
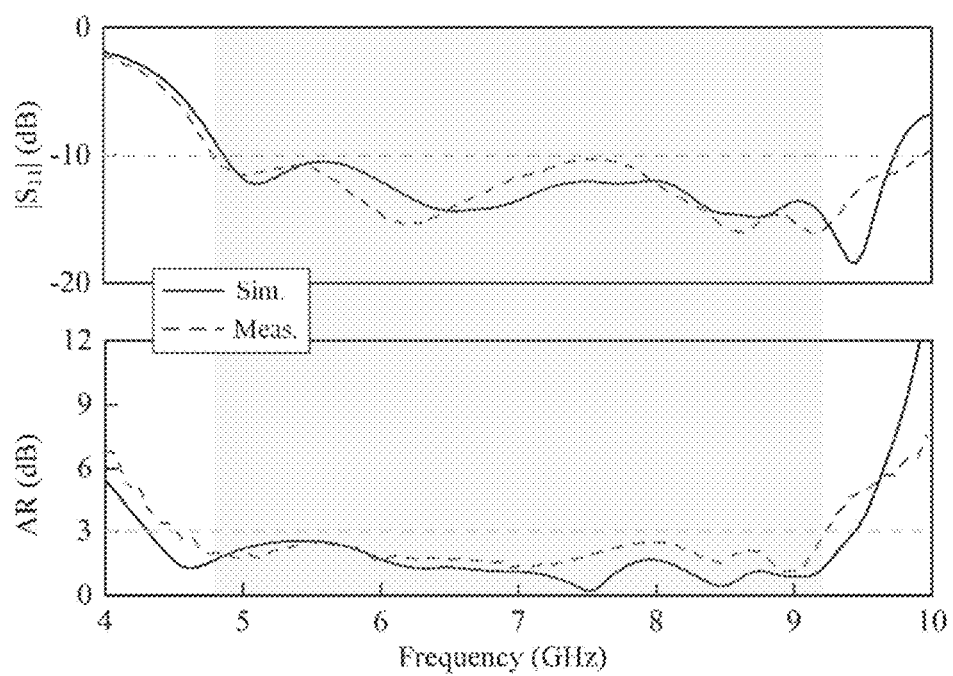
FIG. 8 depicts the measured and simulated reflection coefficients and ARs of the antenna.

FIG. 8 shows the simulated reflection coefficient of the CP DRA 100. With reference to the figure, the measured $|S_{11}|$ has a 10-dB impedance bandwidth ($|S_{11}|≤-10$ dB) of 69.7% (4.80-9.94 GHz), reasonably agreeing with the simulated bandwidth of 66.5% (4.87-9.73 GHz). Both impedance bandwidths are enough for the current 5 GHz WLAN bands (5.15-5.35 GHz and 5.725-5.875 GHz) and new WiFi-6E band (5.925-7.125 GHz). The discrepancy between the measured and simulated results is caused by the tolerances in the fabrication and experiment. FIG. 8 also shows the measured and simulated ARs of the CP DRA at φ=0°, θ=0°. With reference to the figure, reasonable agreement between the measured and simulated results is obtained. The measured and simulated 3-dB AR bandwidths (AR<3) are given by 68.6% (4.52-9.24 GHz) and 73.1% (4.34-9.34 GHz), respectively. It is noted that the bandwidth of the CP antenna is determined by the overlapping region of the impedance and AR passbands. Hence, the CP DRA of the present invention has a measured usable bandwidth of 63.2% (4.80-9.24 GHz).

Figure 9A:
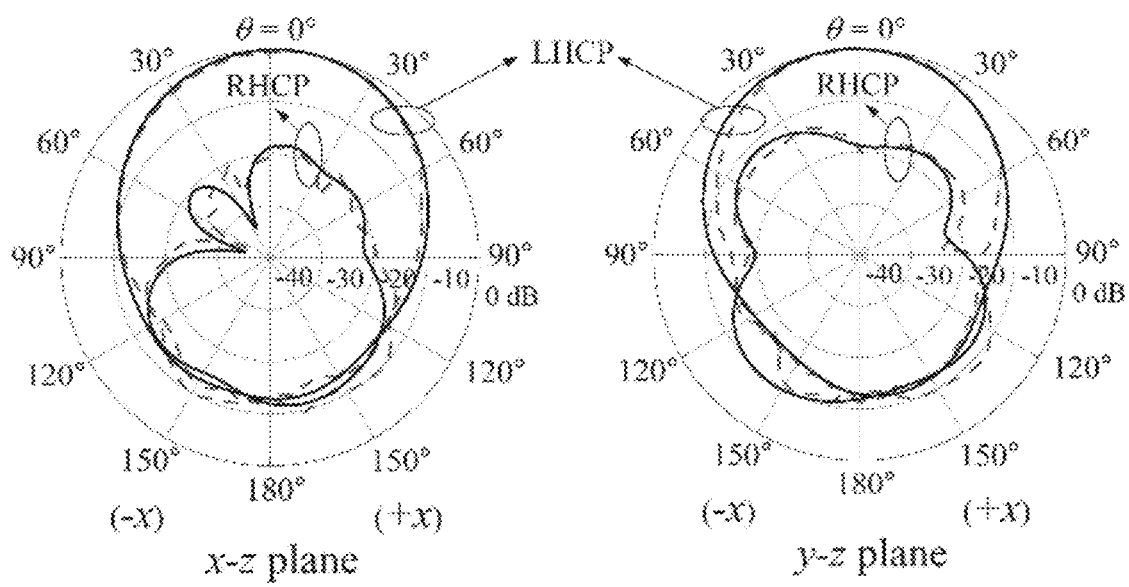
FIGS. 9A-9C depict measured and simulated radiation patterns of the antenna at 5 GHz (FIG. 9A), 7 GHz (FIG. 9B), and 9 GHz (FIG. 9C).
Figure 9B:
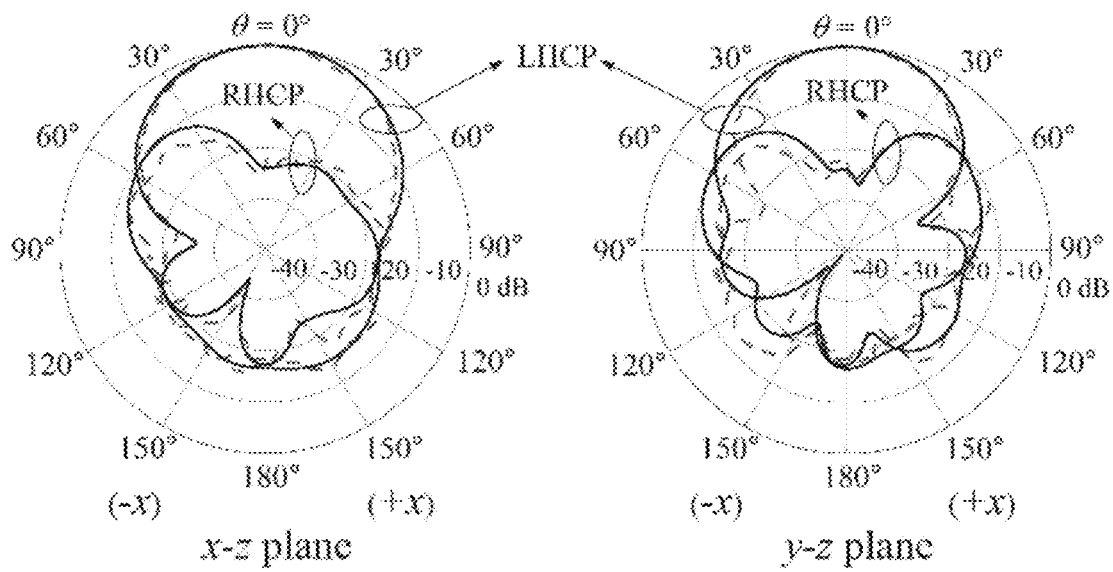
Figure 9C:
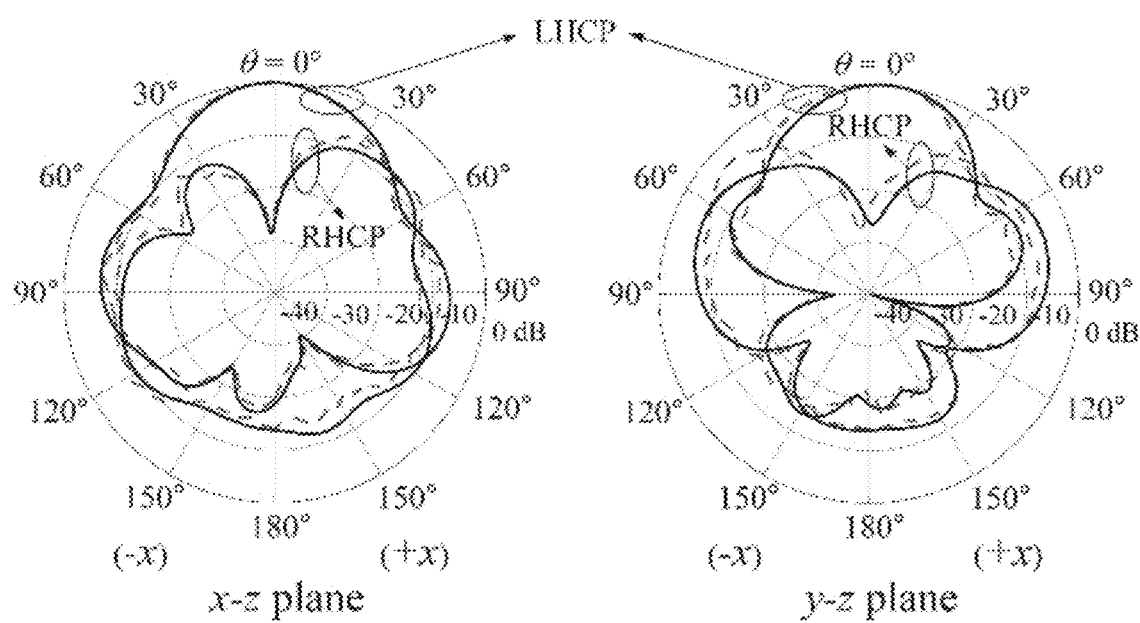

FIG. 9 shows the measured and simulated radiation patterns of the CP DRA at 5.0 GHz, 7.0 GHz, and 9.0 GHz. With reference to the figure, stable broadside radiation patterns are obtained for both the E-plane (x-z plane) and H-plane (y-z plane). In the boresight direction, the measured co-polar left-hand circular polarization (LHCP) fields are stronger than the cross-polar right-hand circular polarization (RHCP) fields by more than 18 dB, enough for practical applications.

Figure 10:
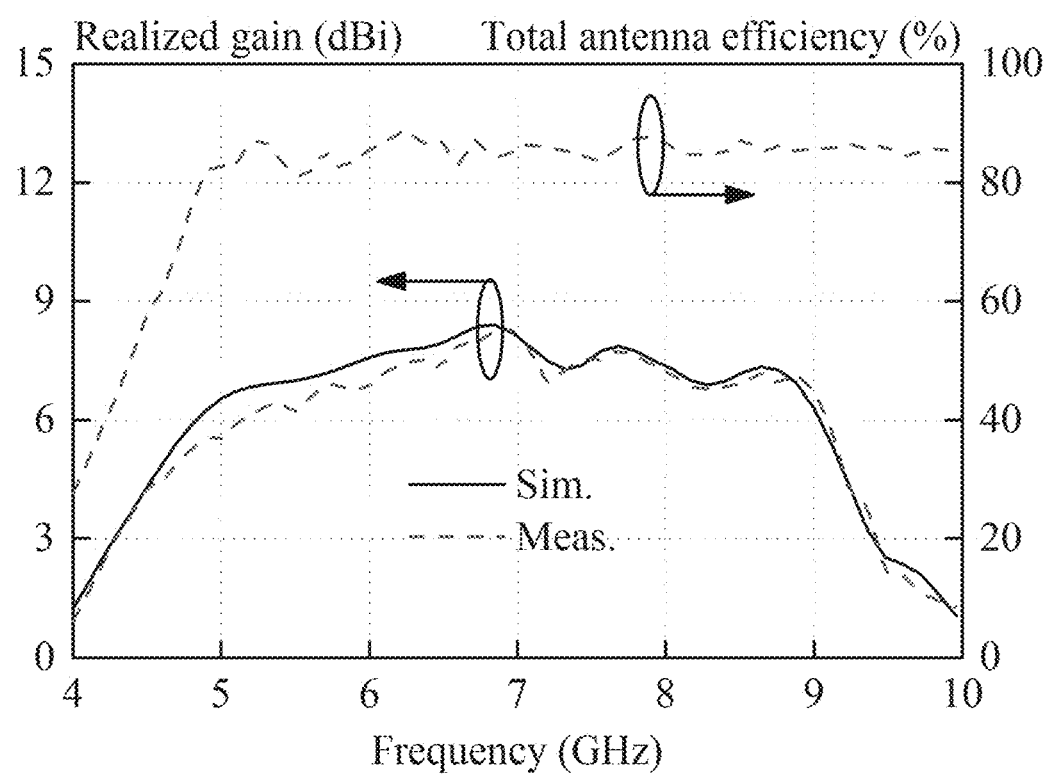
FIG. 10 shows the measured and simulated antenna gains of the 3-D printed antenna in the boresight direction as a function of frequency, along with the measured total antenna efficiency.

FIG. 10 shows the measured and simulated realized gains of the CP DRA in the boresight direction (θ=0°). As can be observed from the figure, the measured and simulated results have a similar trend. However, the former generally has a lower gain as expected, which is due to the power loss caused by experimental imperfections. It can be seen from FIG. 10 that the CP DRA has a measured peak gain of 8.3 dBi at 6.96 GHz. FIG. 10 also shows the measured total antenna efficiency, which has taken the impedance mismatch into account. With reference to the figure, the measured total efficiency is higher than 82% across the overlapped passband (4.80-9.24 GHz), acceptable for practical applications.

Table II shows a comparison of the 3-D-printed CP DRA with other single-fed CP DRAs available in the literature. With reference to the table, the CP DRA features the widest usable bandwidth with the highest peak gain. It is noted that one CP DRA reported in the literature has a wide usable bandwidth but suffers from a low peak gain. Also, for the DR fabrication, all the reference designs use time-consuming mechanical methods, whereas the antenna of the present invention may be conveniently manufactured in a single process using 3-D printing.

TABLE II

COMPARISON BETWEEN INVENTION AND EXISTING SINGLE-FED CP DRA

| Ref. | Center frequency $f_0$ | Dielectric constant(s) | Usable BW[#] | Peak gain[^] (dBi) | DR fabrication |
|---|---|---|---|---|---|
| [12] | 9.5 GHz | 12 | 10.6% | N.A. | Machining |
| [16] | 5.3 GHz | 10 | 11.57% | 3.2 | Machining |
| [19] | 5.5 GHz | 9.8 | 18.2% | 5.8 | Machining |
| [20] | 5.5 GHz | 12.5 | 41% | 2.1 | Machining |
| [22] | 5.5 GHz | 2.1 & 45 | 22.8% | 7.7 | Machining |
| Invention | 7.0 GHz | 3 & 10 | 63.2% | 8.3 | Multi-material 3-D printing |

[#]Overlapping region of the impedance and AR passbands.
[^]Measured peak antenna gain within the usable passband.

The DRA includes a twisted DR embedded with dielectric strips of low dielectric constants, and two types of loaded dielectric slabs with step-height distributions. It is excited by a stepped slot, fed by a small electric ring. By making use of the multiple DRA and slot modes, five AR passbands are obtained and merged to give a wide 3-dB AR bandwidth. A CP DRA operating at C-band was designed, 3-D printed, and tested. It has been found that the antenna has wide measured 10-dB impedance and 3-dB AR bandwidths of 69.7% and 68.6%, respectively, with a very wide overlapping bandwidth of 63.2%. Also, stable radiation patterns have been observed across the overlapped passband, with the peak antenna gain of 8.3 dBi. It is noted that the 3-D printing technique used above can also be applied to other complex-shaped DRA designs with various dielectric constants, greatly reducing the cost and improving the design freedom.

INDUSTRIAL APPLICABILITY

The antennas of the present invention may be used individually or as part of an antenna array. They may be used in wideband circularly polarized wireless communication systems to support high data transfer. The antennas of the present invention have a small footprint and may be applied to compact systems such as global positioning systems and satellite communication systems.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A single-fed wideband circularly-polarized dielectric resonant antenna, comprising:
a lower antenna portion configured as a twisted inverted-frustum having a twist angle of $\theta$ between its top and bottom surfaces, wherein the twist angle $\theta$ is greater than zero degrees and less than approximately 5 degrees;
an upper antenna portion extending from the lower antenna portion top surface, the upper portion including plural interleaved slabs of first and second dielectric materials having respective first and second dielectric constants, the interleaved slabs having a stepwise-varying height between adjacent slabs.

2. The single-fed wideband circularly-polarized dielectric resonant antenna of claim 1, wherein the upper antenna portion plural interleaved slabs have a maximum height at an approximately center position of the lower antenna portion top surface with a decreasing height towards each side of the lower antenna portion top surface.

3. The single-fed wideband circularly-polarized dielectric resonant antenna of claim 1, wherein the first and second dielectric constants are different with the first dielectric constant being a relatively higher dielectric constant and the second dielectric constant being a relatively lower dielectric constant.

4. The single-fed wideband circularly-polarized dielectric resonant antenna of claim 1, further comprising a printed circuit base.

5. The single-fed wideband circularly-polarized dielectric resonant antenna of claim 4, wherein the printed circuit base includes a ground plane having a single excitation slot formed therein.

6. The single-fed wideband circularly-polarized dielectric resonant antenna of claim 5, wherein the antenna is mounted at a 45 degree angle with respect to the single excitation slot.

7. The single-fed wideband circularly-polarized dielectric resonant antenna of claim 5, wherein the excitation slot includes a conductive ring fed by a feedline.

8. An antenna array including a plurality of the single-fed wideband circularly-polarized dielectric resonant antennas of claim 1.

9. The single-fed wideband circularly-polarized dielectric resonant antenna of claim 1, wherein the lower antenna portion includes plural dielectric strips.

10. The single-fed wideband circularly-polarized dielectric resonant antenna of claim 9, wherein at least two of the plural dielectric strips include materials having different dielectric constants.

11. A method of forming the single-fed wideband circularly-polarized dielectric resonant antenna of claim 1, comprising 3-D printing the lower antenna portion and the upper antenna portion.

12. The method of forming the single-fed wideband circularly-polarized dielectric resonant antenna of claim 11, wherein the 3-D printing comprises two-filament 3-D printing.

* * * * *